United States Patent [19]

Momura et al.

[11] 4,402,351
[45] Sep. 6, 1983

[54] OIL SUPPLY MEANS FOR TANKS CONTAINING BLENDED FUEL AND OIL

[75] Inventors: Kazuhiko Momura; Toshiyuki Sato; Atsushi Kanda, all of Iwata; Nobuyuki Kanno, Hamamatsu, all of Japan

[73] Assignee: Yamaha Hatsudoki Kabushiki Kaisha, Iwata, Japan

[21] Appl. No.: 225,449

[22] Filed: Jan. 15, 1981

Related U.S. Application Data

[62] Division of Ser. No. 31,383, Apr. 19, 1979, Pat. No. 4,262,710.

[30] Foreign Application Priority Data

Apr. 28, 1978 [JP] Japan .................................. 53-51704
Jul. 19, 1978 [JP] Japan .................................. 53-88109

[51] Int. Cl.$^3$ .............................................. B65B 3/30
[52] U.S. Cl. .................................. 141/98; 123/73 AD; 141/100; 141/392

[58] Field of Search ................... 123/73 AD, 127, 136; 141/9, 27, 100, 104, 105, 106, 107, 311 R, 392, 98; 222/453, 501, 509

[56] References Cited

U.S. PATENT DOCUMENTS 4,121,631  10/1978  Jones ..................................... 141/27

FOREIGN PATENT DOCUMENTS 40-1911  1/1965  Japan .

*Primary Examiner*—Frederick R. Schmidt
*Attorney, Agent, or Firm*—Donald D. Mon

[57] ABSTRACT

A vehicle which uses "blended" fuel, i.e., fuel and lubricating oil combined, is provided with a fuel tank and an oil tank. A measuring device receives a predetermined amount of oil, and when an actuation occurs, usually associated with a fuel-filling operation the measured amount of oil is discharged into the fuel tank where it blends with the fuel. The actuation may, for example, be derived from the opening and/or closing of a fuel tank closure, or from the insertion of a fuel filler nozzle into the tank.

4 Claims, 6 Drawing Figures

OIL SUPPLY MEANS FOR TANKS CONTAINING BLENDED FUEL AND OIL

This is a division of application Ser. No. 31,383, filed Apr. 19, 1979, now U.S. Pat. No. 4,262,710.

This invention relates to an oil-blended fuel tank for use with an engine using the so-called "blended fuel", in which a fuel (for example, gasoline) and a lubricating engine oil are blended. It contemplates to provide a fuel tank with a measuring device for automatically and easily adding a correct amount of lubricating oil to the fuel in the full tank.

As is well known in the relevant art, a two-cycle engine generally uses an oil-blended fuel. This blended fuel is sold at so few gas stations that a user of the engine is frequently required separately to purchase the fuel and lubricating oil and to blend them himself. However, the user is liable to dislike the blending operation because this operation often causes his hands and clothing to be soiled by the oil. With this in mind, there has been developed the so-called "separate oil supply system", in which a fuel tank and an oil tank are installed separately on a vehicle so that the lubricating oil may be supplied to the engine by means of an oil pump which is provided separately from fuel supply means (the carburetor). However, this system involves the complication of the separate oil pump.

It is therefore an object of the present invention to eliminate the afore-mentioned drawback and to provide a fuel tank with an oil supply means (sometimes called an "oil blender"), in which the desired oil-blended fuel can be prepared automatically in response to the fuel supplying operation such as the opening and closing operations of the filler cap, without requiring complex devices such as an oil pump, while still eliminating the previous blending operation of the fuel and oil.

An oil supply system according to this invention includes a fuel tank, an oil tank, and a measuring device. The measuring device receives a predetermined quantity of oil from the oil tank, and discharges it into the fuel tank where the oil blends with the fuel to form the blended fuel. Actuation means actuates the measuring device to release the predetermined amount of oil.

According to a preferred but optional feature of the invention, the actuation means includes the cover of the fill port of the fuel tank.

According to another preferred but optional feature of the invention, the actuation means is responsive to insertion of a fuel nozzle into the tank.

According to yet other preferred but optional features, the measuring device is a receptacle of known volume with a separately valved oil inlet and oil outlet, or a piston-cylinder assembly with known bore and stroke.

The above and other features of this invention will be fully understood from the following detailed description and the accompanying drawings, in which.

Figure 1:
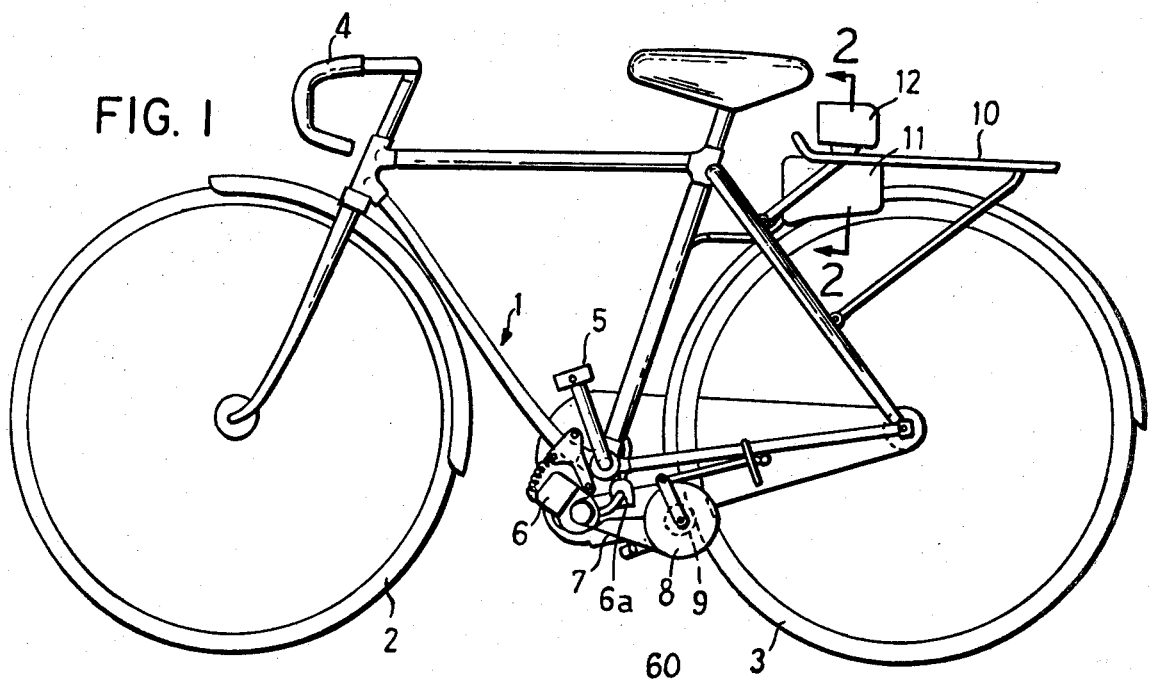
FIG. 1 is a side elevation of a motorized bicycle which includes the invention.
Figure 4:
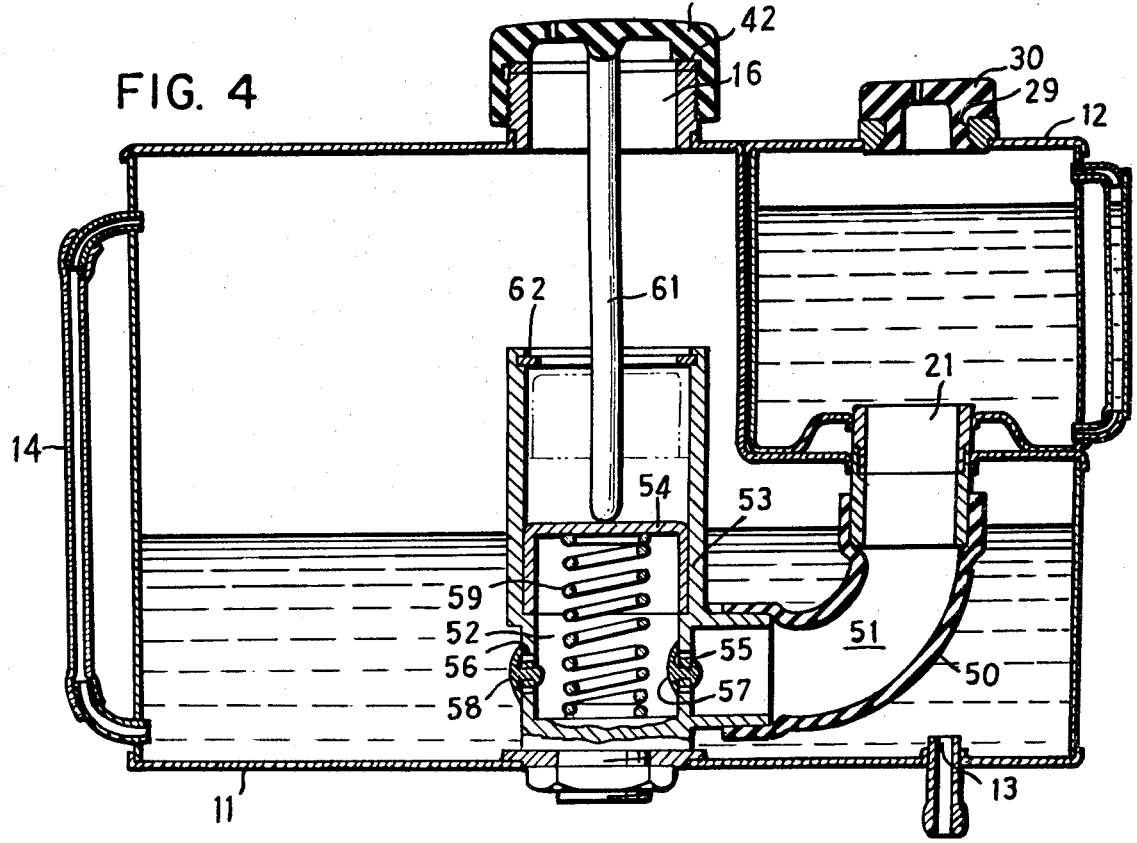
Figure 5:
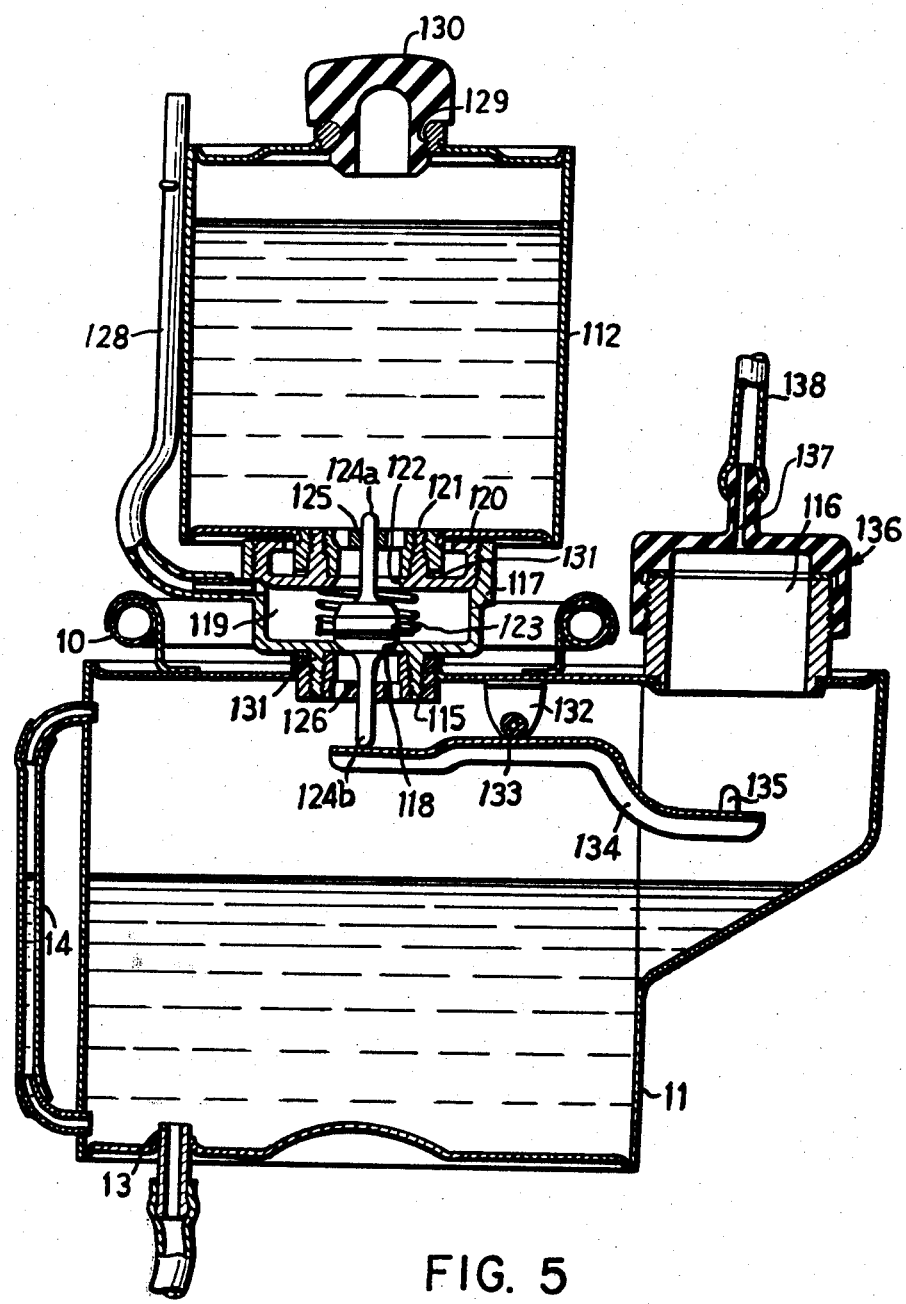
Figure 6:
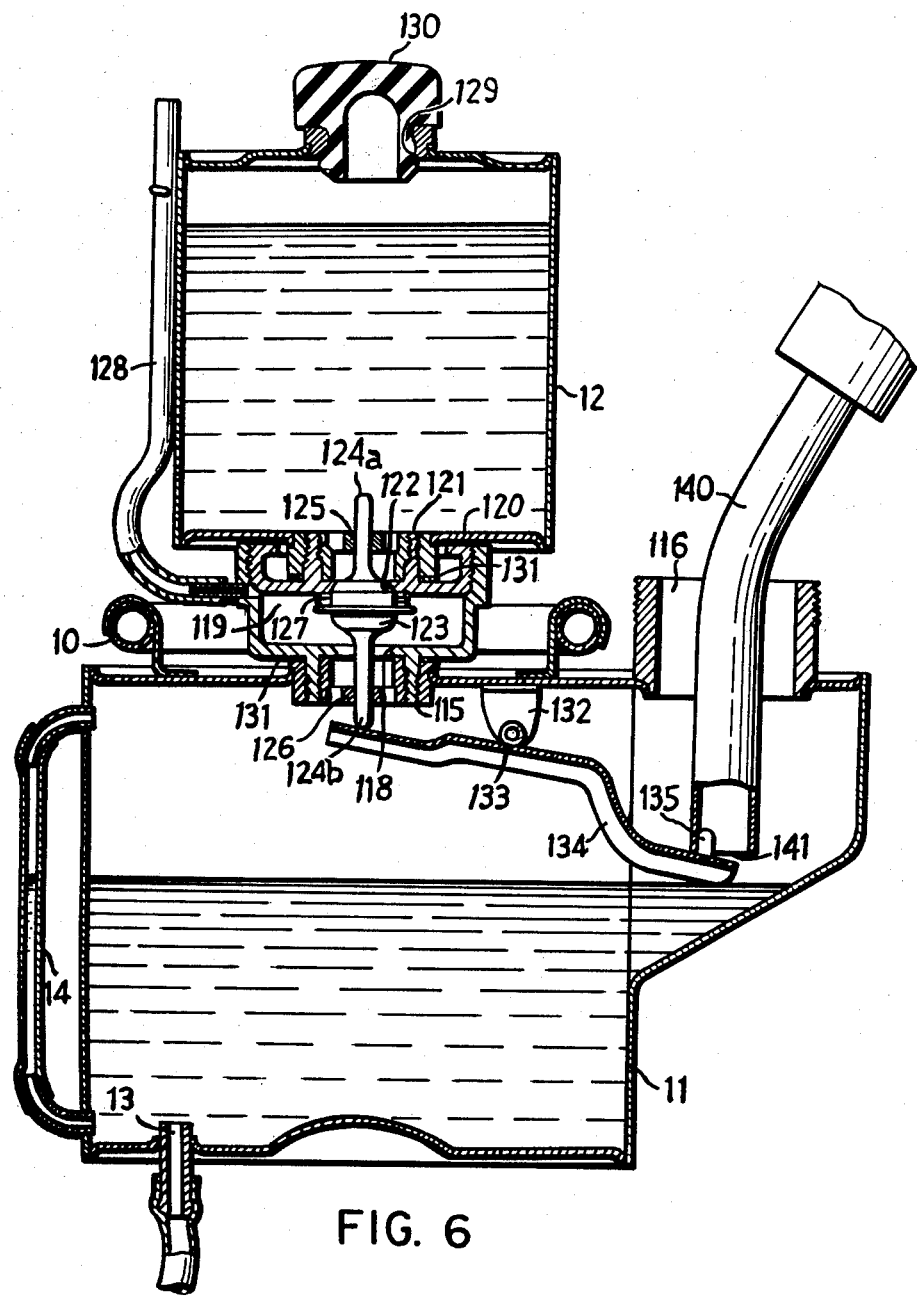

FIG. 4 is a view taken at line 2—2 in FIG. 1, but showing another embodiment of the invention; and FIGS. 5 and 6 are views taken at line 2—2 in FIG. 1, showing still another embodiment of the invention in its repose and actuated conditions, respectively.

Reference numeral 1 appearing in FIG. 1 indicates the frame of the bicycle, numeral 2 a front wheel, numeral 3 a rear wheel, numeral 4 a handlebar, numeral 5 a pedal for driving the rear wheel 3, and numeral 6 an engine of the two-cycle type equipped with a carburetor 6a. Engine 6 is adapted to turn a centrifugal clutch 8 through a driving belt 7. A driving roller 9 is connected to the centrifugal clutch 8 and is brought into and out of operational contact with the rear wheel 3 so that wheel 3 may be driven by the frictional contact between itself and driving roller 9, or disconnected therefrom. Indicated at reference numeral 10 is a luggage carrier, to the lower side of which is mounted a fuel tank 11 (sometimes called an "oil blended fuel tank") for supplying oil-blended fuel to the intake passage of engine 6. A lubricating oil tank 12 is mounted on the upper side of the luggage carrier 10. The oil-blended fuel supplied to the engine intake passage is supplied to the engine 6 after it is metered and mixed with intake air by carburetor 6a, as is well known in the art.

The details of tanks 11 and 12 will now be described with reference to FIGS. 2 and 3. The oil-blended fuel tank 11 has through its bottom wall a fuel supply outlet 13 leading to engine 6. Its side wall is equipped with a fuel level gauge 14 which is made of a transparent tube (or pipe) that provides communication between the upper and lower portions of fuel tank 11. The top wall of tank 11 is pierced by a connecting port 15 and a fuel (or gasoline) supply port 16.

The threaded lower end of a connector 17 is screwed into the connecting port 15. Connector 17 has a cup-shape, and has a lower valve port 18 which communicates with fuel tank 11 by way of connecting port 15. The inside space of the connector 17 forms a communication passage between the lubricating oil tank 12 and fuel tank 11.

In this embodiment, the communication passage also acts as a metering chamber 19 for metering lubricating oil which is to be blended into the fuel. A sealing member 20 is screwed into the upper portion of the connector 17. Into sealing member 20 there is removably screwed an outlet portion 21 which is formed in the bottom wall of the oil tank 12. The sealing member 20 thus far described is formed with an upper valve port 22 which is made co-extensive and aligned with the aforementioned lower valve port 18, and which has communication with the oil tank 12 by way of the opening of the outlet portion 21. On the other hand, there is accommodated in the metering chamber 19 a valve member 23 which is formed with upper and lower valve stems 24a and 24b extending therefrom until they fit in upper and lower stem guides 25 and 26, respectively, while freely extending through the upper and lower valve ports 22 and 18. The valve member 23 is sized and shaped to have its lower side seated removably upon the lower valve port 18 thereby to shut off the valve port 18 but to open the upper valve port 22 at the same time. Likewise, the upper side of the valve member 23 can be removably seated upon the upper valve port 22 to shut off the same while opening the lower valve port 18. The valve member 23 thus constructed is always urged downwardly by the biasing action of a coil spring 27.

An oil level gauge 28 made of a transparent tube or the like is communicated at its lower end with the metering chamber 19. This level gauge 38 extends upwardly along the side wall of the oil tank 12 until its upper extremity is vented to the atmosphere. Here, reference numerals 29, 30 and 31 indicate an oil supply port opened in the top wall of the oil tank 12, an oil cap for closing the oil supply port 29, and a sealing member, respectively.

There is provided in the afore-mentioned fuel tank 11 a bracket 32 which depends from the top wall of the tank 11 and to which an operating lever 34 is hinged by means of a pivot pin 33. The operating lever 34 thus constructed has its intermediate portion abutting against the afore-mentioned lower valve stem 24b, which depends from the valve member 23, and its leading free end extending up to a position below the fuel supply port 16. There is interposed between the leading end portion of the operating lever 34 and the fuel tank 11 a coil spring 35 which has a higher elastic force than the afore-mentioned coil spring 27 so that the operating lever 34 is always urged upward or counter-clockwise about the pivot pin 33 by the biasing force of the coil spring 35 while overcoming the biasing force of the coil spring 27.

On the other hand, the fuel supply port 16 of the fuel tank 11 can be opened and closed by means of a fuel cover 36, which is composed of a fuel cap 37 screwed onto the outer wall of the port 16 and a closing member 38 covered by the cap 37. The closing member 38 thus constructed is formed on its circumference with a pair of opposed engagement members 39, which can be guided in a pair of axial guide grooves 40 formed in the wall of the fuel supply port 16, when the closing member 38 is to be fastened, until they are retained in a pair of circumferential retaining grooes 41 merging into the guide grooves 40. In order to fasten the closing member 38 to the fuel support port 16, more specifically the engagement members 39 thereof are fitted and forced into the guide grooves 40, and the members 39 are then turned in one direction until they are brought into engagement with the retaining grooves 41. Reference numerals 42, 43 and 44 indicate a sealing member, an air breather formed in the closing member 38, and another air breather formed in the fuel cap 37, respectively. Closing member 38 is made integral with a push rod 45, which depends therefrom until its lower extremity abuts against the leading end portion of the afore-mentioned operating lever 34. As a result, this operating lever 34 can be turned through the push rod 45 by fastening and removing the closing member to and from the fuel supply port 16.

Figure 2:
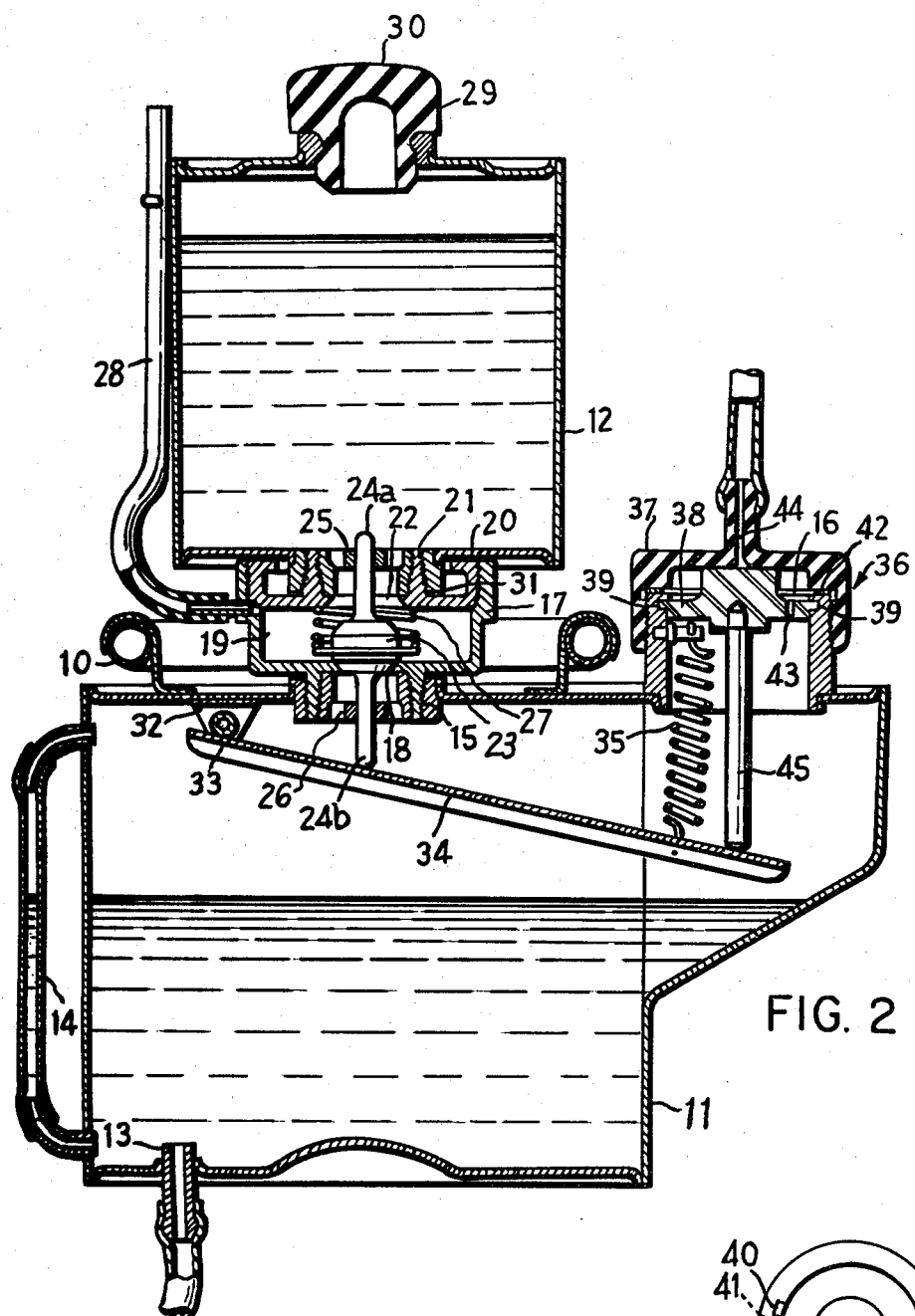
FIG. 2 is a cross-section taken at line 2—2 in FIG. 1 showing the presently preferred embodiment of the invention.
Figure 3:
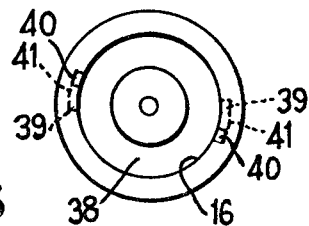
FIG. 3 is a top view of a portion of FIG. 2.

The operations of the above embodiment of FIG. 2 is as follows. In case the fuel supply port 16 is shut by the fuel cover 36 of the fuel tank 11, i.e., by means of the closing member 38 and the fuel cap 37 under the condition in which the oil tank 12 is filled up with sufficient lubricating engine oil, then the push rod 45 depending from the closing member 38 pushes down the leading end of the operating lever 34. As a result, the valve member 23 is pushed down by the biasing force of the coil spring 27 so that its lower side is seated to shut off the lower valve port 18 while opening the upper valve port 22 at the same time. As a result, the inside space of the oil tank 12 communicates with metering chamber 19 via the opening of the outlet portion 21 and the upper valve port 22 so that the engine oil flows from the oil tank 12 downwardly into the metering chamber 19 to its full predetermined capacity.

When the fuel tank is to be refilled as the consequence of consumption of the oil blended fuel in the fuel tank 11, the fuel supply port 16 of the tank 11 is opened. More specifically, when the cap 37 is loosened to remove the closing member 38, the push rod 45 leaves the operating lever 34 together with the closing member 38 so that the operating lever 34 is turned upward, i.e., counter-clockwise by the biasing force of the coil spring 35. As a result, the valve member 23 is raised by the lower valve stem 24b against the biasing force of the coil spring 27 so that the lower side of the valve member 23 is unseated to open the lower valve port 18 and the upper side of the same is seated upon the upper valve port 22 thereby to shut off the port 22. Then, the oil contained in metering chamber 19 flows down into the fuel tank 11 via the lower valve port 18 and the connecting port 15. Under this particular condition, it should be noted that since the upper valve port 22 is shut off by means of valve member 23 lubricating oil in tank 12 cannot flow down into fuel tank 11. Thus, only the predetermined quantity of which occupied the metering chamber 19 will be supplied to the fuel tank 11. Since, moreover, the oil level gauge 28 having communication with the metering chamber 19 has its upper end vented to the atmosphere, the oil in the metering chamber 19 can flow swiftly and smoothly into the fuel tank 11. With the fuel supply port 16 opened, meanwhile, only fuel is supplied to the fuel tank 11 via the open port 16. Then, the fuel flowing into the tank 11 establishes therein such vortexes as can stir and blend the oil which has already been supplied. In these ways, it is possible to reserve in the fuel tank a fuel into which a preset proper quantity of oil is blended.

When the fuel tank 11 is filled up with the oil-blended fuel, the fuel supply port 16 is closed. In this embodiment, when the closing member 38 is fastened, the push rod 45 pushes against the operating lever 34 in the downward direction, against the biasing force of the coil spring 35. As a result, valve member 23 is moved down by coil spring 27 to open the upper valve port 22 and to close the lower valve port 18. Then, oil flows down from the oil tank 12 into the metering chamber 19, thus preparing the next amount of oil to be supplied to fuel tank 11. After the closing member 38 is retained, the fuel cap 37 is screwed down.

According to the embodiment thus far described, a preset quantity of engine oil can be automatically supplied to the fuel tank 11 by the removal of the fuel cover 36 from the tank 11, which forms one step of the fuel supplying process. As a result, it is sufficient merely to pour the fuel into the supply port 16 without making unnecessary tedious operations, as has been required in the prior art to blend in advance the oil and the fuel outside of the fuel tank. Since, moreover, the embodiment makes use of gravity, its construction and handling are considerably simplified in comparison with the prior art that resorts to a special pump.

Oil tank 12 is made removable from the sealing member 20 of the connector 17 forming the metering chamber 19. Therefore, if the oil tank 12 is emptied, it can be replaced by a new tank filled up with the engine oil although the oil could instead be poured into the supply port 29 by removing the oil cap 30.

In the embodiment of FIG. 4, there is connecting tube 50 (which may alternatively be a pipe) connected to the bottom of the lubricating oil tank 12. It forms a communication passage 51 which in turn is connected to a metering chamber 52 formed in the oil-blended fuel tank 11. The metering chamber 52 has its upper extremity defined by a piston 54 which is fitted vertically movably in a cylinder 53. The metering chamber 52 thus defined has communication both with the communication passage 51 by way of a plurality of inlet ports 55 which are formed in the side walls of cylinder 53, and with the inside of the fuel tank 11 by way of a plurality of outlet ports 56 which are formed in the side wall of the cylinder. There is mounted around the inlet ports 55 an inlet check valve 57 which allows the oil to flow only in the direction from the communication passage 51 to the metering chamber 52. There is also mounted around the outlet ports 56 an outlet check valve 58 which allows the oil to flow only in the direction from the metering chamber 52 to the fuel tank 11.

A coil spring 59 is mounted in the metering chamber which is operative to urge the piston 54 upwardly at all times. In FIG. 4, the top wall of the piston 54 is shown with its upper surface abutting against the lower end of push rod 61 which depends from a fuel cover 60 removably covering the oil supply port 16. This establishes the lowermost position of the piston. Reference numeral 62 indicates a stopper for regulating the uppermost position of the piston 54.

In FIG. 4, when fuel cover 60 is removed, the push rod 61 is extracted with it, so that piston 54 is raised by the biasing force of coil spring 59. As a result, metering chamber 52 is "evacuated" (enlarged) so that the lubricating oil is sucked from the oil tank 12 into the metering chamber 52 by way of the communication passage 51 and the inlet ports 55. The piston raises to its dashed-line position in FIG. 4, so as to draw in a known, predetermined quantity of oil. After the fuel is supplied through the open fuel supply port 16, supply port 16 is shut by reattaching means fuel cover 60. Then the push rod 61 pushes down the piston 54 against the biasing force of the coil spring 59 so that the pressure in the metering chamber 52 is boosted to pump out the oil from the metering chamber 52 into the fuel tank 11 by way of the outlet ports 56, and the piston is retained at its position illustrated in solid line. As a result, the engine oil is blended into the supplied fuel in fuel tank 11.

The embodiment of FIGS. 5 and 6 is mounted to the same vehicle as in the embodiments of FIGS. 1–4, and like numerals are used to denote that fact. This embodiment differs from the others in that actuation of the oil supply means is caused by the insertion of the fuel nozzle following opening of the fill port, rather than as the consequence of manipulating the closure of the fill port.

In this embodiment, fuel tank 11 has its top wall formed with a connecting port 115 and a fuel (or gasoline) supply port 116. The threaded lower end of a connector 117 is screwed into the afore-mentioned connecting port 115. The connector 117 is made to have a cup shape and is formed with a lower valve port 118 which has communication with the fuel tank 11 by way of the connecting port 115. The inside space of the connector 117 forms a communication passage between lubricating oil tank 12 and fuel tank 11. In this embodiment, the communication passage also acts as a metering chamber 119 for metering the lubricating oil to be blended, as in the embodiment of FIG. 2. A sealing member 120 is screwed into the upper portion of the connector 117. Into the sealing member 120, there is removably screwed an outlet portion 121 which is formed in the bottom wall of the oil tank 12. The sealing member 120 is formed with an upper valve port 122 which is made coextensive and aligned with lower valve port 118 and which has communication with the oil tank 12 by way of the opening of outlet portion 121.

There is accommodated in the metering chamber 119 a valve member 123 which is formed with upper and lower valve stems 124a and 124b extending therefrom until they are fitted in upper and lower stem guides 125 and 126, respectively, while they freely extend through the upper and lower valve ports 122 and 118. The valve member 123 is sized and shaped to have its lower side seated removably upon the lower valve port 118 thereby to shut off the valve port 18 but to open the upper valve port 122 at the same time. Likewise, the upper side of the valve member 123 can be removably seated upon the upper valve port 122 to shut off the same while opening the lower valve port 118. The valve member 123 thus constructed is always urged downwardly by the biasing action of a coil spring 127.

An oil level gauge 128 made of a transparent tube or the like is communicated at its lower end with the metering chamber 119. This level gauge 128 is guided upward along the side wall of the oil tank 12 to where its upper extremity is vented to the atmosphere. Here, reference numerals 129, 130 and 131 indicate an oil supply port opened in the top wall of the oil tank 12, an oil cap for closing the oil supply port 129, and a sealing member, respectively.

There is provided in the fuel tank 11 a bracket 132 which depends from the top wall of the tank 11 and to which an operating lever 134 is hinged by means of a pivot pin 133. The operating lever 134 thus constructed has one end portion abutting against valve stem 124b, which depends from the valve member 123, and its other end extending below the fuel supply port 116 in a manner to face the same. It should be noted here that the operating lever 134 is formed with a retaining upright projection 135 at such a position below the fuel supply port 116 as can retain the end of a fuel supply nozzle, which will be described later in more detail. On the other hand, the fuel supply port 116 of the fuel tank 11 can be opened and closed by means of a fuel cover 136, which is screwed onto the outer wall of the port 116. Reference numeral 137 indicates an air breather which is formed in the fuel cover 136 and vented to the atmosphere.

As best seen in FIG. 6 fuel supply port 116 is so sized as freely to admit fuel supply nozzle 140 which dispenses fuel from a storage tank at a gas station. When the nozzle 140 is inserted to a preset depth into the fuel tank 11 through the fuel supply port 116, its leading outlet 141 abuts against the end of operating lever 134. Then operating lever 134 is turned clockwise by the weight of the nozzle 140. Outlet 141 of nozzle 140 is so retained by the projection 135 of the operating lever 134 that it does not slide off.

Under the normal condition in which fuel cover 136 of fuel tank 11 is closed, operating lever 134 is released and turned counter-clockwise, as best seen in FIG. 5. Thus, valve member 123 is pushed down by the biasing force of coil spring 127. As a result, the lower side of the valve member 123 is seated to shut off the lower valve port 118 while opening the upper valve port 122. Then, the inside space of the oil tank 12 communicates with metering chamber 119 via the opening of outlet portion 121 and upper valve port 122, so that engine oil from oil tank 12 flows down into metering chamber 119 and fills it to its full predetermined capacity.

When the blended fuel supply runs low, and needs to be replenished, the following operations are carried out. For fuel supply, the vehicle is driven to a gas station or the like, and fuel supply nozzle 140 is inserted into the fuel tank 11 through fuel supply port 116 after removing cover 136 from the tank 11. Then the outlet 141 of nozzle 140 abuts against the other end of operating lever 134 so that lever 134 is turned clockwise by the weight of nozzle 140, as shown in FIG. 6. Outlet 141 of nozzle 140 is held in engagement with the retaining projection 135, and the nozzle 140 is prevented from sliding away from the engagement with operating lever 134, so that the nozzle 140 can maintain its position suitable for the desired automatic fuel supply without being manually held.

When operating lever 134 is turned clockwise, one end raises valve member 123 through lower valve stem 124b against the biasing force of the coil spring 127. As a result, the lower side of valve member 123 is unseated to open lower valve port 118 and the upper side of the same becomes seated upon upper valve port 122 thereby to shut off port 122. Then the engine oil which was reserved in metering chamber 119 flows down into fuel tank 11 via lower valve port 118 and connecting port 115. Because upper valve port 122 is shut off by means of valve member 123, lubricating oil in the tank 12 cannot flow down into fuel tank 11. Thus, only the preset quantity of the oil which occupied metering chamber 119 can be supplied to the fuel tank 11. Because oil level gauge 128 communicates with metering chamber 119 and has its upper vented, chamber 119 is vented to the atmosphere when the valve member 123 opens the lower valve port 118. Oil in the metering chamber 119 can therefore flow swiftly and smoothly into the fuel tank 11. Only fuel is supplied from nozzle 140. Fuel flowing into tank 11 establishes vortexes so as to stir and blend into the fuel the oil which has already been supplied. In these ways, it is possible to charge into the fuel tank 11 a fuel into which a preset proper quantity of oil is blended.

After a preset quantity of oil-blended fuel is supplied up, the nozzle 140 is extracted to fasten the cover 136. Operating lever 134 becomes free from the weight of the nozzle 140. Valve member 123 is moved down by the action of coil spring 127 to open the upper valve port 122 and to close lower valve port 118. As a result, engine oil is allowed to flow down from oil tank 12 into metering chamber 119, thus preparing the next charge of oil to be supplied to fuel tank 11.

According to the invention, a preset quantity of engine oil can be automatically supplied to the fuel tank 11. As a result, it is sufficient to charge only the fuel into the supply port at a gas station or the like. Thus, such troublesome operation is not required as has been required in the prior art to blend in advance the oil and fuel outside of the fuel tank before charging them into the tank. Thus, fuel can be used from stations which do not sell blended fuels. Because the construction of the present invention does not require a special pump for use in a separate oil supply system, it is considerably simplified, as is the handling, in comparison with the prior art.

Also, oil tank 12 may be made removable, so that instead of refilling the oil tank a replacement full tank can be substituted for a empty one. Optionally, it may of course merely be refilled through its own fill port.

The quantity of the lubricating oil to be supplied is always at a preset value. Therefore the blending ratio between the oil and fuel after adding the fuel may be different from filling to filling, depending upon the quantity of oil-blended fuel left in the fuel tank 11 before refilling. However, it is possible to maintain the blending ratio substantially at a constant level if the fuel level gauge 14 is provided at some position with an indication of some level at which refilling will result in an optimally proportioned blend.

This invention in its several embodiments frees the user from handling the oil or fuel. In all embodiments there is a measuring means, for example chambers 19 and 119, and cylinder 53 to measure out a predetermined quantity of oil. Actuation means is provided to supply the measured quantity to the fuel tank. In FIGS. 1-4, the actuation means is part of the fill port cover (closure), and in FIGS. 5-6, it is responsive to the filler nozzle. In FIGS. 2 and 5, the oil discharges into the fuel tank before the fuel, and so a good blending operation can result from the turbulent flow of fuel into the tank. In FIG. 4, the oil is injected into the fuel after the fuel is charged into the fuel tank, and this mixing advantage is not provided. However, it enters with some velocity, which will cause at least some mixing, and the turbulence caused by motion of the vehicle will later provide sufficient blending movement.

This invention thereby provides convenient and clean means for making blended fuel.

This invention is not to be limited by the embodiments shown in the drawings and described in the description, which are given by way of example and not of limitation, but only in accordance with the scope of the appended claims.

We claim:

1. In combination: a fuel tank having a fill port and a removable closure for said fill port through which fuel can be charged; an oil tank for containing oil to be blended into fuel contained in said fuel tank, said oil tank having an inlet port and an outlet port communicating with a measuring means, said measuring means comprising a chamber of known volume having an inlet opening adapted to receive a predetermined quantity of oil from said oil tank outlet port and an outlet opening to discharge said predetermined quantity of oil into said fuel tank; valve means for selectively and alternately closing and opening said inlet and outlet openings; and actuating means for actuating said valve means comprising lever means contactible with said valve means, said lever means being so disposed and arranged as to be contacted by a filler nozzle when said filler nozzle is to fill said tank with fuel, said contact serving to cause said lever means to rotate and to move said valve means to open said outlet opening and close said inlet opening, said valve means reverting to the condition where the outlet opening is closed when said contact with said filler nozzle does not occur.

2. A combination according to claim 1 in which said lever means is a first class lever disposed inside said fuel tank, with one arm engageable with said valve means, and its other arm engageable by said filler nozzle when inserted into said fuel tank.

3. A combination according to claim 2 in which said valve means is biased toward closure of said outlet port.

4. A combination according to claim 1 in which said valve means is biased toward closure of said outlet opening.

* * * * *